United States Patent [19]

Masuda et al.

[11] 4,301,050

[45] Nov. 17, 1981

[54] ROAD MARKING COMPOSITION

[75] Inventors: Shinichi Masuda, Tokyo; Tsugio Tanaka, Ageo; Naoyuki Kishi, Tokyo; Yukio Nagasaka, Kawagoe, all of Japan

[73] Assignee: Atom Chemical Paint Co., Ltd., Tokyo, Japan

[21] Appl. No.: 157,739

[22] Filed: Jun. 9, 1980

[30] Foreign Application Priority Data

Jun. 7, 1979 [JP]   Japan ................................ 54-70548

[51] Int. Cl.$^3$ ...................... C08L 91/06; C08F 10/14; C09D 5/00; C09F 1/04
[52] U.S. Cl. ........................... 260/28 R; 260/28.5 A; 260/31.8 N; 260/31.8 HR; 260/105; 526/290
[58] Field of Search ................ 260/28.5 A, 28 R, 105, 260/31.8 N, 31.8 HR; 526/290; 528/311, 333

[56] References Cited

U.S. PATENT DOCUMENTS

| | | | |
|---|---|---|---|
| 521,270 | 6/1894 | Pirschl | 260/105 |
| 2,468,534 | 4/1949 | Young et al. | 260/28.5 A |
| 2,572,071 | 10/1951 | St. Clair et al. | 260/105 |
| 3,778,421 | 12/1973 | Hayashi et al. | 260/28.5 A |
| 3,932,329 | 1/1976 | Lakshmanan | 260/28.5 A |
| 4,207,217 | 6/1980 | Gauninazzi et al. | 260/28 R |

*Primary Examiner*—H. S. Cockeram
*Attorney, Agent, or Firm*—Sughrue, Mion, Zinn, Macpeak & Seas

[57] ABSTRACT

A road marking composition comprising a resin having a melt viscosity of from about 30 to 80 cps at 150° C. and a modifier composed of at least one metal oxide of at least one metal selected from Groups II and IV of short form of the Periodic Table. The resin may be rosin-modified maleic resin, hydrogenated resin, rosin ester, polyamide, and petroleum resin. Optionally, a polar wax and/or a surfactant may be present. Fillers and extenders include: pigments, glass beads, clay, plaster, slaked lime, alumina diatomaceous earth, sand, and plasticizers.

17 Claims, 1 Drawing Figure

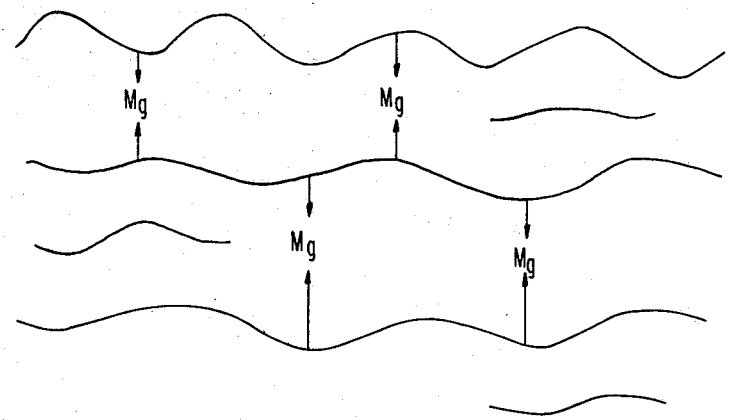

ROAD MARKING COMPOSITION

BACKGROUND OF THE INVENTION

1. Field of the Invention

This invention relates to a road marking composition, and more particularly, to a road marking composition which can be applied to the surfaces of roads at a temperature not higher than 140° C.

2. Description of the Prior Art

Many studies have been made on a road marking composition that can be applied to the surface of roads efficiently and which assures maximum safety for applicator crews, but no single composition that satisfactorily meets such requirements has yet been offered to the industry. A road marking composition that meets these requirements should provide the surface of a road with a fast-drying and strong coating at the lowest possible temperature. Most of the conventional road marking compositions comprise a mixture of a heat resistant rigid resin which decomposes at 230° C. or higher, a color pigment, an extender pigment, a reflecting agent, etc. Such road marking compositions require a temperature of at least 200° C. for application onto the road surface, and they have the following disadvantages: (1) the resin component is easily deteriorated by heat, and therefore a coating of the intended quality is hard to obtain; (2) only a few types of resin can be used; (3) a long period of time is required for the composition to melt, and therefore efficient application is difficult; (4) the application procedure involves burn hazards and other potential harms such as those caused by fuming to operators; and (5) a thick coating often dries insufficiently at high atmospheric temperatures.

SUMMARY OF THE INVENTION

The road marking composition of this invention comprises a resin having a melt viscosity of from about 30 to 80 cps at 150° C. and a modifier composed of at least one metal oxide of at least one metal selected from Groups II and IV of short form of the Periodic Table, and such composition may optionally contain polar wax and/or a surfactant.

BRIEF DESCRIPTION OF THE DRAWING

The FIGURE shows schematically how the molecules of the resin forming the composition of this invention are cross-linked with the metal oxide.

DETAILED DESCRIPTION OF THE INVENTION

The resin to be used in this invention has a melt viscosity of from about 30 to 80 cps at 150° C., an average molecular weight in the range of from 500 and 5,000 and an acid value of from about 20 to 250. If its acid value exceeds 250, the resin becomes very low in resistance to water, weather and chemicals. If the acid value is lower than 20, the resin has adequate degree of water-, weather- and chemical-resistance, but its melt viscosity does not fall within the range of from 30 to 80 cps at 150° C. The resin preferably has an acid value of from 40 to 200. A suitable resin can be prepared from a compound having an amino group or epoxy group by properly controlling its amine value or epoxy equivalent. Resins thus prepared include a rosin-modified maleic resin, hydrogenated rosin, rosin ester, polyamide resin, and petroleum resins. The term "petroleum resins" referred to herein means resins obtained by polymerizing or copolymerizing decomposition products of naphtha and preferably those obtained by polymerizing or copolymerizing fractions of $C_5$ to $C_9$. These resins may be used independently or as a mixture to provide the desired flowability. Illustrative resins and their characteristics are set forth in Table 1 below.

TABLE 1

| | Rosin Modified Maleic Resin | Hydrogenated Rosin | Rosin Ester | Polyamide Resin | Petroleum Resin |
|---|---|---|---|---|---|
| Resin | | | | | |
| Trade Name (manufacturer) | Beckasite F393 (Dainippon Ink & Chemicals, Inc.) | Arakeed 4102 (Arakawa Chemical Industries, Ltd.) | Harimac R-303 (Harima Chemicals, Inc.) | Versamide DPX-375 [Henkel (Japan), Ltd.] | Hyrez MA (Mitsui Petrochemical Industries, Ltd.) |
| Physical Characteristics | | | | | |
| Viscosity (cps/150° C.) | 60 | 50 | 50 | 45 | 70 |
| Softening[1] Point (°C.) | 90 | 80 | 92 | 95 | 92 |
| Acid Value | 100 | 160 | 190 | 40 | <1 |
| Molecular Weight | 1,200 | 750 | 800 | 1,000 | |
| Weather[2] (yellowing factor) | 0.06 | 0.06 | 0.03 | 0.04 | 0.08 |

[1]Measured according to JIS K-5665 5.4
[2]Measured according to JIS K-5400 6.16

The resins typified by the illustrated examples are used in amounts that vary with the type of resin, and they usually make up from about 15 to 30 wt%, and preferably from 19 to 22 wt%, of the total weight of the road marking composition.

When incorporated in the road marking composition of this invention together with the resin having a melt viscosity between 30 and 80 cps (at 150° C. ), which is higher than that of the conventionally used resin, the modifier composed of at least one metal oxide of at least one metal selected from Groups II and IV of short form of the Periodic Table, combined with the high acid value of the resin, helps provide a composition with increased resistance to water, weather and chemicals.

As shown by the reaction equation indicated below, the metal oxide modifier of this invention reacts with the resin having an acid value between 20 and 250 to form a coordinate bond. Two possible explanations for the formation of a coordinate bond are:
(1) the activity due to the difference in the ionization tendency of the metal contained in the modifier aids in forming a coordinate bond; and
(2) the difference in the standard reduction potential, ionization potential, and electronegativity of such metal ions aids in forming a coordinate bond.

The mechanism by which the resin is modified by the modifier of this invention is believed to be illustrated by the following reaction equation (assuming that the modifier is MgO):

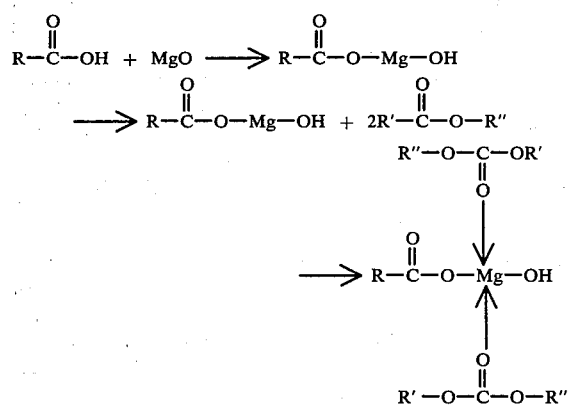

As is shown by the formula of the reaction product, the coordinate bond between a metallic atom (Mg) and an oxygen atom causes a cross-linking reaction between the molecules of the resin through the metal oxide, to thereby produce a gel structure of the resin and form a stable composition. The manner in which the molecule of the resin is cross-linked with the metal oxide is shown schematically in FIG. 1.

Following the reaction indicated above, the modifier forms a complex with the resin and provides a composition with improved film performance. The amount of the modifier to be used varies with its type as well as with the type of the resin with which it is combined, and it is generally in the range of from about 0.3 to 8 wt% based on the total weight of the road marking composition. If it is smaller than 0.3 wt%, the resin cannot be adequately modified with the modifier, and if it is greater than 8 wt%, excessive gelation of the resin occurs. Examples of the modifier are zinc oxide, white lead, lithopone, basic lead sulfate, magnesium oxide, heat resistant chrome yellow, cadmium yellow, iron oxide and titanium dioxide (rutile or anatase; industrial titanium dioxide which is coated with $Al_2O_3$, etc., is low in its ability to form a coordinate bond). These modifiers may be used independently or as a mixture. Zinc oxide, white lead and magnesium oxide are particularly preferred.

Zinc oxide is used in an amount of from about 0.5 to 3 wt%, and is preferably from 1.0 to 2 wt%; white lead is used in an amount of from about 0.5 to 3 wt%, and is preferably from 1.0 to 2 wt%; magnesium oxide is used in an amount of from about 0.3 to 2.5 wt%, and is preferably from 0.3 to 1.0 wt%; basic lead sulfate is used in an amount of from about 1 to 5 wt%, and is preferably from 1 to 3 wt%; and heat resistant chrome yellow is used in an amount of from about 1 to 8 wt%, and is preferably from 3 to 6 wt%. If these modifiers are used in amounts less than the lower limits of their respective ranges, the improved film performance properties begin to diminish, and if they are used in amounts greater than the upper limits, excessive gelation of the resin may begin to occur.

The polar wax to be used in the composition of this invention aids in improving the flowability and weather resistance of the resulting road marking composition. Examples of the wax are polar polyolefinic wax as well as natural and synthetic polar paraffin wax that have an amino group, epoxy group, methyl group, etc. Polar polyolefinic wax is effective in imparting flowability to the resin, reducing the tackiness of the resulting coating, and providing a fast-drying and weather resistant coating. A suitable polar polyolefinic wax has a molecular weight of from about 500 to 5,000 and a softening point of from about 80 to 110° C. The polar wax is generally used in an amount from about 0.3 to 1.5 wt%, and is preferably from 0.4 to 0.8 wt%, based on the total weight of the road marking composition. To improve the flowability of the composition, a nonionic or anionic surfactant may be used. A nonionic surfactant is preferred. The surfactant desirably has a hydrophile-lyophile balance (HLB) of from about 6 to 15, and preferably from 8 to 12. A nonionic surfactant in the form of a lake which has Sn, Al, Mg, Zn, etc., incorporated in the molecule is very effective. The surfactant can generally be used in an amount from about 0.3 to 3 wt%, and is preferably from 0.5 to 1.5 wt%, based on the total weight of the road marking composition.

The road marking composition of this invention may further contain an inorganic extender pigment having a particle size in the range of from 0.1 to 1,000 microns and in which 5 to 60 cc of oil can be absorbed per 100 g. Hard extenders are preferred from the purpose of increasing the abrasion resistance of the composition. Illustrative suitable inorganic extender pigments are glass beads, calcium carbonate, clay, plaster, slaked lime, alumina, diatomaceous earth, silica sand and silica. These extenders may be used independently or as a mixture while care is taken to provide the desired oil absorption and closest packing. The effectiveness of silicon oxide increases as their specific surface area increases. Talc is effective in preventing the sedimentation of the inorganic extender pigment and providing a fast-drying composition, although it must be used in a relatively great amount to achieve its intended effect. Glass beads can be used to serve as a reflecting agent, and spherical glass beads having a size between about 10 and 400 microns, and preferably between 60 and 100 microns and which absorb not more than 10 cc of oil per 100 gram of the beads may advantageously be used in combination with other extenders, because they provide plastic flowability for the road marking composition and no part of the resin component of the composition is absorbed on the beads due to the relatively small amount of oil absorbed in them. Glass beads used as reflecting agent generally have a size in the range of from 105 to 840 microns. Generally non-spherical glass particles or rigid extenders composed of sharp particles are not preferred, since the resulting road marking composition is very low in flowability. The silicon oxides are used in an amount from about 0.1 to 0.8 wt%, and preferably from 0.3 to 0.5 wt%, based on the total weight of the road marking composition and the talcs are used in 4 to 10 wt%, and preferably from 5 to 8 wt%, based on the total weight of the composition.

If desired, the road marking composition of this invention may contain a resin plasticizer, for example, a modified alkyd having a molecular weight in the range of from 500 to 3,000 and a viscosity of not more than 2,000 cps at room temperature (20–30° C.). The composition may also include inorganic or organic heat resistant color pigments such as chrome green, cobalt green, ultramarine blue, Prussian blue, chrome vermillion; and phthalocyanine and naphthol organic pigments.

One illustrative method of preparing the road marking composition of this invention is as follows: predetermined amount of resin and plasticizer is placed in an enamelled porcelain beaker, and heated until they melt. A small amount of pigment, wax, and glass beads are added to form a well blended composition under stirring to prevent excessive localized heating, with care being taken so that the resulting paint composition does not have a temperature higher than 130° C. When a good dispersion has been made of the contents of the beaker, the contents are heated to a desired temperature between 120 and 130° C., and a sample can be prepared for flowability measurement according to the method specified in JIS K-5665.

The thus-prepared road marking composition of this invention is highly flowable even at low temperatures (e.g., 100 to 140° C.). While the conventional thermoplastic road marking materials require 200° C. for application onto road surfaces, the composition of this invention can be applied at 140° C. or lower with the following appendant advantages: (1) the application speed is at least twice as fast as with the coneventional road marking materials; (2) low application temperature means minimum burn hazards to applicator crews; (3) fuming due to decomposition of the resin component is minimized; (4) low application temperature also means that the resin is less likely to be deteriorated by heat, and therefore the paint composition adheres more strongly to road surfaces; (5) the composition of this invention can be used not only with the self-travelling applicator that is generally used to apply a high-temperature, low-viscosity road marking composition but it can also be used efficiently with a hand-operated applicator intended for use at low temperatures; (6) since the resin component incorporated has a higher acid value than that of conventionally used resin, the road marking composition of this invention has less tendency towards chalking; and (7) the resulting coating is strong enough to prevent cracking and wrinkling, and is resistant to yellowing.

The invention is now illustrated in greater detail by reference to the following examples which are given here for illustrative purposes only and are by no means intended to limit the scope of the invention.

EXAMPLES 1 to 31

Thirty-one samples of the road marking composition according to this invention were prepared according to the basic formulation specified below. The resin used in the respective samples are indicated in Table 2-1. To evaluate the effect of the acid value of rosin modified maleic resin on the performance of coatings of sample A's, the acid value was varied as indicated in Table 2-2. The effect of other factors on the resulting road marking composition was determined using samples F, G, H and Y, including varying the type of modifier, the size of glass beads used as extender pigment (1), the type of wax component, and the amount of modifier (heat resistant chrome yellow), as indicated in Table 2-3, Table 2-4, Table 2-5 and Table 2-6, respectively.

| Basic Formulation | wt % |
| --- | --- |
| Resin | 20 |
| Plasticizer (modified alkyd) | 2 |
| Modifier (magnesium oxide) | 1.5 |
| White pigment (industrial titanium dioxide) | 10 |
| Extender pigment (1) (glass beads, 80–200 μ) | 25 |
| Extender pigment (2) (calcium carbonate) | 24.7 |
| Wax (polyolefinic) | 0.8 |
| Reflecting agent (glass beads, 105–840 μ) | 16 |
| Total | 100 |

TABLE 2-1

| Resin | Sample |
| --- | --- |
| Rosin modified maleic resin | A-1 thru A-5 |
| Hydrogenated rosin | B |
| Rosin ester | C, F-1 thru F-6, G-1 thru G-3, H-1 thru H-8 |
| Polyamide resin | D |
| Petroleum resin | E |

TABLE 2-2

| Sample | Acid Value |
| --- | --- |
| A-1 | 15 |
| A-2 | 30 |
| A-3 | 220 |
| A-4 | 270 |
| A-5* | 220 |

*Indicates the omission of modifier.

TABLE 2-3

| Sample | Modifier (wt %) | | |
| --- | --- | --- | --- |
| | Zinc Oxide | Magnesium Oxide | White Lead |
| F-1 | 1.5 | — | — |
| F-2 | 2.5 | — | — |
| F-3 | — | 0.5 | — |
| F-4 | — | 1.5 | — |
| F-5 | — | — | 1.5 |
| F-6 | — | — | 2 |

TABLE 2-4

| Sample | Glass Beads as Extender Pigment (wt %) | | |
| --- | --- | --- | --- |
| | 10–60 μ | 60–100 μ | 500–840 μ |
| G-1 | 25 | — | — |
| G-2 | — | 25 | — |
| G-3 | — | — | 25 |

TABLE 2-5

| Sample | Wax or Surfactant Component |
| --- | --- |
| H-1 | — |
| H-2 | polyethylene wax |
| H-3 | epoxy-containing polyethylene wax |
| H-4 | amino-containing polyethylene wax |
| H-5 | paraffin wax (m.w. 1,000, softening point 100° C.) |
| H-6 | anionic surfactant* |
| H-7 | nonionic surfactant** |
| H-8 | lake-containing nonionic surfactant*** |

*Manufactured by Kao-Atlas Company, Ltd.
**HLB = 8, manufactured by Dai-Ichi Kogyo Seiyaku Co., Ltd.
***HLB = 12, manufactured by Toho Chemical Industrial Co., Ltd.

TABLE 2-6

| Sample | Content of Modifier (heat resistant chrome yellow) (wt %) |
|---|---|
| Y-1 | — |
| Y-2 | 2.5 |
| Y-3 | 5 |
| Y-4 | 7.5 |
| Y-5 | 10 |

These samples were subjected to various tests the results of which are summarized in Table 3 below. The formulation of the two conventional road markers used as controls is as follows.

| | wt % |
|---|---|
| Resin (rosin modified maleic resin) | 20 |
| Plasticizer (modified alkyd resin) | 2 |
| White pigment (industrial titanium dioxide) | 10 |
| Extender pigment (calcium carbonate) | 52 |
| Reflecting agent (glass beads) | 16 |

Control (1) in Table 3 was heated to 200° C., and control (2) was heated to 120° C.

TABLE 3

| | Sample | | | | | | | | |
|---|---|---|---|---|---|---|---|---|---|
| | A-1 | A-2 | A-3 | A-4 | A-5 | B | C | D | E |
| Flowability[1] (cm/120° C.) | 4.5 | 8.0 | 8.0 | 2.5 | 9.0 | 8.5 | 8.5 | 10.0 | 6.5 |
| Softening point[2] (°C.) | 105 | 95 | 95 | 110 | 95 | 90 | 95 | 88 | 100 |
| Abrasion resistance[3] (mg) | 100 | 100 | 95 | 110 | 110 | 100 | 100 | 95 | 100 |
| Compressive strength[4] (kg/cm$^2$) | 300 | 280 | 300 | 450 | 300 | 300 | 280 | 190 | 350 |
| Time to dry (min/120° C.) | 1 | 1 | 1 | 1 | 3 | 2 | 1.5 | 2 | 1 |
| Stain resistance[5] (point) | 2 | 2 | 2 | 2 | 4 | 3 | 3 | 5 | 3.5 |
| Time to melt (min/200 kg) | 50 | 20 | 20 | 40 | 20 | 30 | 25 | 20 | 30 |
| Adhesion | 40/50 | 50/50 | 50/50 | 30/50 | 40/50 | 50/50 | 50/50 | 50/50 | 50/50 |
| Weather resistance[6] | wrinkles and cracks developed | good | good | cracks developed | wrinkles and cracks developed | good | good | good | good |
| Whiteness[7] (%) | 79 | 83 | 82 | 78 | 80 | 81 | 83 | 79 | 81 |
| Water resistance[8] | good | good | good | chalking occurred | chalking occurred | good | good | good | good |
| Chemical resistance[9] | good | good | good | chalking occurred | chalking occurred | good | good | good | good |

| | Sample | | | | | |
|---|---|---|---|---|---|---|
| | F-1 | F-2 | F-3 | F-4 | F-5 | F-6 |
| Flowability[1] (cm/120° C.) | 8.5 | 5.5 | 7.5 | 8.5 | 7.8 | 4.5 |
| Softening point[2] (°C.) | 95 | 105 | 95 | 90 | 95 | 103 |
| Abrasion resistance[3] (mg) | 100 | 105 | 100 | 95 | 100 | 100 |
| Compressive strength[4] (kg/cm$^2$) | 280 | 400 | 350 | 300 | 300 | 400 |
| Time to dry (min/120° C.) | 1.5 | 1 | 1.5 | 1 | 2 | 1 |
| Stain resistance[5] (point) | 3 | 2 | 3 | 2 | 3 | 2 |
| Time to melt (min/200 kg) | 25 | 40 | 30 | 25 | 30 | 45 |
| Adhesion | 50/50 | 45/50 | 50/50 | 50/50 | 50/50 | 40/50 |
| Weather resistance[6] | good | good | good | good | good | good |
| Whiteness[7] (%) | 83 | 80 | 81 | 83 | 79 | 79 |
| Water resistance[8] | good | good | good | good | good | good |
| Chemical resistance[9] | good | good | good | good | good | good |

| | Sample | | | | | | |
|---|---|---|---|---|---|---|---|
| | G-1 | G-2 | G-3 | H-1 | H-2 | H-3 | H-4 |
| Flowability[1] (cm/120° C.) | 5.0 | 8.5 | 6.8 | 5.5 | 8.5 | 8.0 | 8.5 |
| Softening point[2] (°C.) | 95 | 95 | 98 | 100 | 95 | 95 | 95 |
| Abrasion resistance[3] (mg) | 100 | 100 | 130 | 100 | 100 | 100 | 100 |
| Compressive strength[4] (kg/cm$^2$) | 280 | 280 | 280 | 330 | 280 | 280 | 280 |
| Time to dry (min/120° C.) | 1.5 | 1.5 | 2.0 | 2.5 | 1.5 | 1 | 1 |
| Stain resistance[5] (point) | 3 | 3 | 3 | 4 | 3 | 2 | 2 |
| Time to melt (min/200 kg) | 252 | 25 | 25 | 35 | 25 | 30 | 25 |
| Adhesion | 50/50 | 50/50 | 50/50 | 50/50 | 50/50 | 50/50 | 50/50 |
| Weather resistance[6] | good | good | good | some wrinkles developed | good | good | good |
| Whiteness[7] (%) | 79 | 83 | 83 | 81 | 83 | 83 | 80 |
| Water resistance[8] | good | good | good | good | good | good | good |
| Chemical resistance[9] | good | good | good | good | good | good | good |

| | Sample | | | | | | | |
|---|---|---|---|---|---|---|---|---|
| | H-5 | H-6 | H-7 | H-8 | Y-1 | | Y-2 | Y-3 |
| Flowability[1] (cm/120° C.) | 8.5 | 8.6 | 8.5 | 8.5 | 9.5 | | 9.5 | 10.0 |
| Softening point[2] (°C.) | 95 | 90 | 90 | 90 | 100 | | 95 | 95 |
| Abrasion resistance[3] (mg) | 98 | 100 | 100 | 95 | 100 | | 95 | 95 |
| Compressive strength[4] (kg/cm$^2$) | 300 | 270 | 250 | 200 | 190 | | 230 | 280 |

TABLE 3-continued

| | | | | | | | |
|---|---|---|---|---|---|---|---|
| Time to dry (min/120° C.) | 1 | 1 | 1 | 1.5 | 2 | 1 | 1 |
| Stain resistance[5] (point) | 2 | 2 | 2 | 2 | 5 | 3 | 2 |
| Time to melt (min/200 kg) | 30 | 20 | 20 | 20 | 20 | 20 | 20 |
| Adhesion | 50/50 | 50/50 | 50/50 | 50/50 | 40/50 | 50/50 | 50/50 |
| Weather resistance[6] | good | good | good | good | wrinkles developed with the occurrence of cracking and chalking | good | good |
| Whiteness[7] (%) | 83 | 83 | 83 | 83 | — | — | — |
| Water resistance[8] | good | good | good | good | chalking occurred | good | good |
| Chemical resistance[9] | good | good | good | good | chalking and blistering occurred | good | good |

| | | Sample | | Control | |
|---|---|---|---|---|---|
| | | Y-4 | Y-5 | (1) | (2) |
| Flowability[1] (cm/120° C.) | | 8.0 | 4.5 | 8.0 cm/200° C. | 0.5/120° C. |
| Softening point[2] (°C.) | | 100 | 105 | 100 | 120 |
| Abrasion resistance[3] (mg) | | 95 | 100 | 110 | 160 |
| Compressive strength[4] (kg/cm²) | | 280 | 350 | 350 | 520 |
| Time to dry (min/120° C.) | | 1 | 1 | 2 min/200° C. | 0.5 |
| Stain resistance[5] (point) | | 2 | 2 | 3 | 5 |
| Time to melt (min/200 kg) | | 20 | 30 | 45 | — |
| Adhesion | | 50/50 | 40/50 | 50/50 | 0/50 |
| Weather resistance[6] | | good | cracking occurred | some wrinkles developed with yellowing | wrinkles developed |
| Whiteness[7] (%) | | — | — | 80 | 75 |
| Water resistance[8] | | good | good | good | good |
| Chemical resistance[9] | | good | good | good | good |

[1] To determine the flowability, about 50 g of a sample held at 160° C. was cast on a plate from a height of about 20 cm and cooled to solidify. The extent of the cast sample was measured in centimeters.
[2] Measured according to JIS K-5665 5.4.
[3] Measured according to JIS K-5665 5.9.
[4] Measured according to JIS K-5665 5.10.
[5] A paint prepared at a predetermined temp. was applied to a predetermined thickness. About 15 seconds later, the surface of the film was rubbed with a brush with carbon black laid on, until a uniform coat of carbon black was formed. Thereafter, carbon black was wiped off with a dry cloth. The sample was then rated by the 6-point method depending upon the degree of stain in comparison with a reference plate; a sample with virtually no stain was rated zero, and one with minimum removal of stain was rated five, with samples between the two extremes being rated one thru four according to the degree of stain.
[6] Measured according to JIS K-5400 6.16.
[7] Measured according to JIS K-5400 6.6.
[8] Measured according to JIS K-5400 7.2.
[9] Measured according to JIS K-5400 7.5.

As is clear from the data in Table 3, the road marking composition of this invention heated to 120° C. exhibits flowability comparable to that of control (1) heated to 200° C. In addition, the composition has satisfactorily high resistance to abrasion, pressure and weather.

The tests on Samples A-1 thru A-5 shows that when heated to 120° C., A-1 thru A-3 are satisfactorily flowable, and they have good film performance, but that A-4 forms a gel. Sample A-5, containing no modifier, exhibits good flowability, but it forms a film low in resistance to water, weather, and chemicals.

The tests on Samples F-1 thru F-6 show that the modifier according to this invention provides a road marking composition with high flowability and good physical properties.

In the tests on Samples G-1 thru G-3, G-1 (using small glass beads) was rather poor in flowability, wheareas with G-3 (using large beads) a considerable number of beads came off of the surface.

The tests on Samples H-1 thru H-8 show that H-2 thru H-8, containing a wax component, have higher flowability and higher resistance to weather and stain than H-1, containing no wax.

The tests on Samples Y-1 thru Y-5 show that Y-1, containing no modifier, is low in resistance to weather and stain, whereas Y-2 thru Y-4, containing predetermined amounts of heat resistant chrome yellow, provided a road marking composition with good performance. Sample Y-5 containing an excessive amount of chrome yellow gels, and did not provide satisfactory composition.

While the invention has been described in detail and with reference to specific embodiments thereof, it will be apparent to one skilled in the art that various changes and modifications can be made therein without departing from the spirit and scope thereof.

What is claimed is:

1. A road marking composition comprising a resin having a melt viscosity of from about 30 to 80 cps at 150° C. and a modifier composed of at least one metal oxide of at least one metal selected from Groups II and IV of short form of the Periodic Table.

2. A road marking composition as in claim 1 comprising a resin having a melt viscosity of from about 30 to 80 cps at 150° C., a modifier composed of at least one metal oxide of at least one metal selected from Groups II and IV of short form of the Periodic Table, and a polar wax.

3. A road marking composition as in claim 1 comprising a resin having a melt viscosity of from about 30 to 80 cps at 150° C., a modifier composed of at least one metal oxide of at least one metal selected from Groups II and IV of short form of the Periodic Table, and a surfactant.

4. A road marking composition as in claim 2 comprising a resin having a melt viscosity of from about 30 to 80 cps at 150° C., a modifier composed of at least one metal oxide of at least one metal selected from Groups II and IV of short form of the Periodic Table, a polar wax, and a surfactant.

5. A road marking composition as in claim 1, 2, 3, or 4, wherein the average molecular weight of the resin is from about 500 to 5,000.

6. A road marking composition as in claim 1, 2, 3, or 4, wherein the acid value of said resin is from about 20 to 250.

7. A road marking composition as in claim 1, 2, 3, or 4, wherein said resin selected from the group consisting of a rosin-modified maleic resin, a hydrogenated rosin, a rosin ester, a polyamide, and a petroleum resin.

8. A road marking composition as in claim 1, 2, 3, or 4, wherein said resin comprises from about 15 to 30 wt% of the total weight of the composition.

9. A road marking composition as in claim 1, 2, 3, or 4, wherein said metal oxide modifier is present in said composition in an amount from about 0.3 to 8 wt% based on the total weight of the composition.

10. A road marking composition as in claim 1, 2, 3, or 4, wherein said metal oxide modifier is selected from the group consisting of zinc oxide, white lead, lithopone, basic lead sulfate, magnesium oxide, heat resistant chrome yellow, cadmium yellow, iron oxide, and rutile- or anatase-type titanium dioxides.

11. A road marking composition as in claim 2 or 4, wherein said polar wax is a polyolefinic wax having an average molecular weight of from about 500 to 5,000 and a softening point of from about 80 to 110° C.

12. A road marking composition as in claim 2 or 4, wherein said polar wax is present in an amount of from about 0.3 to 1.5 wt% based on the total weight of the composition.

13. A road marking composition as in claim 3 or 4, wherein said surfactant is present in an amount from about 0.3 to 3 wt% based on the total weight of the composition.

14. A road marking composition as in claim 1, 2, 3 or 4 further containing an inorganic extender pigment.

15. A road marking composition as in claim 14, wherein said inorganic extender pigment is selected from the group consisting of glass beads, calcium carbonate, clay, plaster, slaked lime, alumina, diatomaceous earth, silica sand, and silica.

16. A road marking composition as in claim 1, 2, 3, or 4 further containing a resin plasticizer.

17. A road marking composition as in claim 1, 2, 3, or 4 further containing an inorganic or organic heat resistant color pigment.

* * * * *